US012759159B2

(12) United States Patent
Ando

(10) Patent No.: US 12,759,159 B2
(45) Date of Patent: Oct. 13, 2026

(54) ROBOT SYSTEM AND CONTROL APPARATUS

(71) Applicant: FANUC CORPORATION, Yamanashi (JP)

(72) Inventor: Toshiyuki Ando, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 209 days.

(21) Appl. No.: 18/273,817

(22) PCT Filed: Feb. 14, 2022

(86) PCT No.: PCT/JP2022/005635

§ 371 (c)(1),
(2) Date: Jul. 24, 2023

(87) PCT Pub. No.: WO2022/176800

PCT Pub. Date: Aug. 25, 2022

(65) Prior Publication Data

US 2024/0308081 A1 Sep. 19, 2024

(30) Foreign Application Priority Data

Feb. 18, 2021 (JP) ................................ 2021-024577

(51) Int. Cl.
*B25J 9/16* (2006.01)

(52) U.S. Cl.
CPC ........... *B25J 9/1697* (2013.01); *B25J 9/1664* (2013.01)

(58) Field of Classification Search
CPC .................. B25J 9/1664; B25J 9/1697; G05B 2219/40053; G05B 2219/40607; G05B 2219/39094

(Continued)

(56) References Cited

U.S. PATENT DOCUMENTS 9,984,291 B2 5/2018 Okazaki
11,845,191 B1 * 12/2023 Kuzhinjedathu ..... B23P 19/007

(Continued)

FOREIGN PATENT DOCUMENTS

DE 60205300 T2 12/2005
DE 102012007254 A1 10/2012

(Continued)

OTHER PUBLICATIONS

International Search Report issued in PCT/JP2022/005635 mailed on Apr. 26, 2022 with English Translation (5 pages).

(Continued)

*Primary Examiner* — Khoi H Tran

(74) *Attorney, Agent, or Firm* — HAUPTMAN HAM, LLP

(57) ABSTRACT

A robot system according to one aspect of the present disclosure includes a robot arm mechanism to which a hand for gripping a workpiece stored in a container with an opening at a top of the container is attached, a sensor configured to obtain two-dimensional image data including the container and three-dimensional point cloud data including the container, and a control apparatus configured to identify a position, direction, and size of the opening of the container based on the image data and the point cloud data and control the robot arm mechanism so as not to interfere with the container. It is possible to identify the position, orientation, and size of the opening of the container without performing a touch-up operation on the container.

5 Claims, 6 Drawing Sheets

(58) Field of Classification Search
USPC .......................................................... 700/259
See application file for complete search history.

(56) References Cited

U.S. PATENT DOCUMENTS

| | | | | |
|---|---|---|---|---|
| 2011/0122231 | A1 | 5/2011 | Fujieda et al. | |
| 2015/0321354 | A1 | 11/2015 | Nishihara | |
| 2016/0059419 | A1 * | 3/2016 | Suzuki | B25J 9/1692<br>901/14 |
| 2019/0351557 | A1 | 11/2019 | Suzuki | |
| 2020/0356068 | A1 | 11/2020 | O'Hare et al. | |
| 2020/0394818 | A1 | 12/2020 | Konishi | |
| 2021/0039257 | A1 | 2/2021 | Tonogal et al. | |
| 2021/0114826 | A1 * | 4/2021 | Simon | B25J 9/1697 |
| 2023/0105746 | A1 * | 4/2023 | Drumwright | B25J 13/085<br>700/259 |
| 2023/0162371 | A1 * | 5/2023 | Shibata | G06T 7/74<br>382/180 |

FOREIGN PATENT DOCUMENTS

| | | | |
|---|---|---|---|
| DE | 102013012224 | A1 | 2/2014 |
| EP | 3767589 | A1 | 1/2021 |
| JP | 2007-144586 | A | 6/2007 |
| JP | 2015-213973 | A | 12/2015 |
| JP | 2019-155535 | A | 9/2019 |
| JP | 2019-159901 | A | 9/2019 |
| JP | 2019-198950 | A | 11/2019 |
| JP | 2020179441 | A * | 11/2020 |

OTHER PUBLICATIONS

Written Opinion of International Searching Authority issued in PCT/JP2022/005635 mailed on Apr. 26, 2022 with English Translation (7 pages).
Beijing Zhaodi Technology Co., Ltd., "UG NX 12.0—Rapid Introduction and Application Techniques", Apr. 30, 2019, China Machine Press, 7pp.
Toru Morikawa, "Microcomputer Graphic Software Package and Applications", Nov. 30, 1989, Tianjin Science and Technology Press, 5pp.
Zhang Zhongjiang, "SolidWorks 2018 Mechanical Design", CAD/CAM/CAE Engineering Application Series, Jul. 31, 2018, 44-45 pages, Chinese Machine Press, 7pp.

* cited by examiner

ROBOT SYSTEM AND CONTROL APPARATUS

TECHNICAL FIELD

Embodiments described herein relate generally to a robot system and a control apparatus.

BACKGROUND ART

Conventionally, there has been known a robot system in which a robot grips and conveys workpieces stacked in bulk inside a container. In such a robot system, it is necessary to teach the robot the position, orientation, and size of the opening of the container so that the robot does not interfere with the container. As a teaching method, for example, it is disclosed that a robot arm is moved to bring a hand into contact with an edge defining an opening of a container, thereby obtaining the position coordinate values of the edge (for example. Patent Literature 1).

However, it is troublesome to perform the touch-up operation of bringing the hand into contact with the edge of the container as described above every time the container is replaced. In addition, the work of attaching a touch-up pin to the robot arm and manually bringing the pin attached to the robot arm into contact with a predetermined location on the edge of the container depends on the skill of the worker, which may result in variations in quality.

CITATION LIST

Patent Literature

Patent Literature 1: Japanese Unexamined Patent Application Publication No. 2015-213973

DETAILED DESCRIPTION

Figure 1:
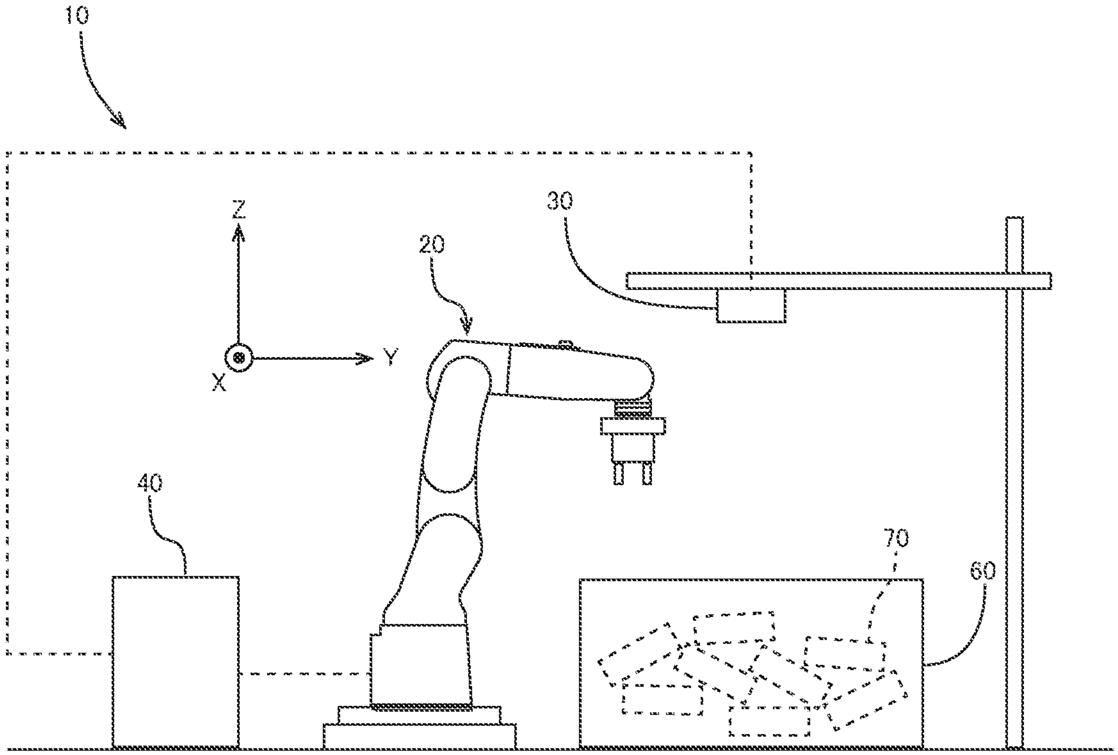
FIG. 1 is an external view showing an example of a robot system according to the present embodiment.

A robot system according to one aspect of the present disclosure includes a robot arm mechanism to which a hand for gripping a workpiece stored in a container with an opening at a top of the container is attached, a sensor configured to obtain two-dimensional image data including the container and three-dimensional point cloud data including the container, and a control apparatus configured to identify a position, orientation, and size of the opening of the container based on the image data and the point cloud data and control the robot arm mechanism so as not to interfere with the container.

Hereinafter, a robot system according to the present embodiment will be described with reference to the drawings. In the following description, constituent elements having substantially the same function and configuration are denoted by the same reference numeral, and repetitive descriptions will be given only where necessary.

Hereinafter, a robot system according to the present embodiment will be described with reference to FIG. 1 to FIG. 5.

As shown in FIG. 1, a robot system 10 according to the present embodiment includes a robot arm mechanism 20 to which a hand for gripping workpieces 70 stacked in bulk inside a container 60 is attached, a three-dimensional sensor 30 for photographing, from above, a rectangular container arrangement area 50 set on an installation surface of the robot arm mechanism 20, and a control apparatus 40 for controlling the robot arm mechanism 20 and the three-dimensional sensor 30. The X axis, the Y axis, and the Z axis of the robot coordinate system of the robot arm mechanism 20 are defined in the orientations shown in FIG. 1 and FIG. 2. For example, the X axis is defined as any axis parallel to the installation surface of the robot arm mechanism 20, the Y axis is defined as an axis parallel to the installation surface of the robot arm mechanism 20 and orthogonal to the X axis, and the Z axis is defined as an axis orthogonal to the X axis and the Y axis. The Z axis is parallel to an axis perpendicular to the installation surface of the robot arm mechanism 20. The container arrangement area 50 is set so that its short axis is parallel to the X axis of the robot coordinate system and its long axis is parallel to the Y axis of the robot coordinate system.

Any mechanism such as a coordinate type robot, a cylindrical coordinate type robot, a rectangular coordinate type robot, a vertical articulated type robot, a horizontal articulated type (scalar type) robot, or a parallel link type robot can be applied to the robot arm mechanism 20.

The three-dimensional sensor 30 is arranged by a support member so as to face an opening 63 of a container 60 arranged in the container arrangement area 50. The three-dimensional sensor 30 obtains two-dimensional image data and three-dimensional point cloud data including the container 60. The container image is an image in which pixels having color information (color tone and gradation) are arranged in accordance with two-dimensional coordinates, whereas the point cloud data is data including, in the field of view, the container arrangement area 50 photographed from above, and is a collection of pixels (points) having three-dimensional coordinate information.

The three-dimensional coordinate system in the point cloud data is defined in the same orientation as the robot coordinate system. For example, the three-dimensional coordinate system is defined to have two axes parallel to the installation surface of the robot arm mechanism 20 and orthogonal to each other as the X axis and the Y axis, and an axis perpendicular to the installation surface of the robot arm mechanism 20 as the Z axis. The Z axis direction is also referred to as a depth direction. The two-dimensional coordinates in the image data correspond to the X coordinate and the Y coordinate of the three-dimensional coordinates in the point cloud data, respectively. That is, the two-dimensional position in the image data is associated with the three-dimensional position in the three-dimensional point cloud data. The three-dimensional position of a point designated in the two-dimensional image data can be identified from the point cloud data.

The three-dimensional sensor 30 may be a device employing a stereo camera system. In the stereo camera system, two-dimensional image data captured by two cameras is subjected to image processing so that point cloud data in which color information and three-dimensional coordinate information are given to pixels can be obtained. The image data may be image data captured by one camera or image data obtained by performing image processing on image data captured by two cameras. Of course, the three-dimensional sensor 30 is not limited to the above as long as it can obtain two-dimensional image data and three-dimensional point cloud data. The three-dimensional sensor 30 can be used selectively from a variety of known devices that apply light cutting, time-of-flight, depth from defocus, and the like. The three-dimensional sensor 30 may be composed of two devices having a fixed positional relationship.

The container 60 is configured as a box with an opening at the top. The box has a rectangular parallelepiped shape, and the opening 63 defined by the inner wall of the box has a rectangular shape. The lateral direction (width direction), longitudinal direction (length direction), and height direction of the container 60 are defined as an x direction, a y direction, and a z direction, respectively. The inner wall corresponds to the inner surfaces of the four side walls 61 constituting the box. The upper end surfaces 61*a* of the four side walls 61 constituting the box will be simply referred to as upper end surfaces (edges) 61*a* of the container 60. A portion where two side walls 61 form a right angle will be referred to as a corner 61*b* of the container 60. The four corners of the inner wall of the container 60 correspond to the four corners of the opening 63 of the container 60, respectively. Since the opening 63 of the container 60 has a rectangular shape, the position, orientation, and size of the opening 63 of the container 60 can be identified by knowing the positions of at least three corners of the opening 63 of the container 60. Of course, the position, orientation, and size of the opening 63 of the container 60 can be identified by knowing the positions of two diagonally facing corners of the opening 63 of the container 60.

In a work program to be described later, for example, the position of the opening 63 of the container 60 is represented in a robot coordinate system (X. Y. Z). The orientation of the opening 63 of the container 60 is represented by a rotation angle around the X axis, a rotation angle around the Y axis, and a rotation angle around the Z axis with respect to a reference orientation. The orientation of the opening 63 of the container 60 serving as a reference is an orientation in which the opening surface (xy plane) of the container 60 is parallel to the installation surface (XY plane) of the robot arm mechanism 20, and the long axis (y axis) direction of the opening surface of the container 60 is parallel to the long axis (Y axis) direction of the container arrangement area 50 (see FIG. 2). When the rotation angle around the X axis and the rotation angle around the Y axis are both 0 degrees, the opening surface of the container 60 is horizontal.

Figure 2:
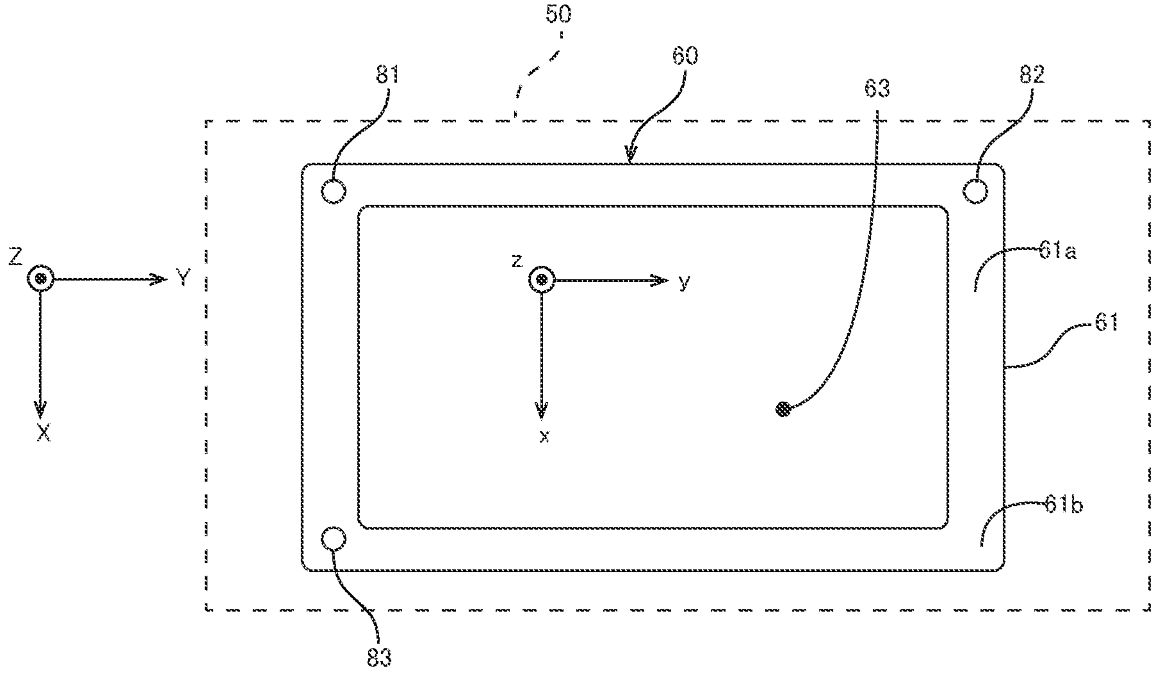
FIG. 2 is a plan view showing an example of the container shown in FIG. 1.

As shown in FIG. 2, circular markers 81, 82, 83 are provided at specific positions of the upper end surfaces 61*a* of three corners 61*b* of the four corners of the container 60. The markers 81, 82, 83 may be provided as sticker members having an adhesive applied to the back surfaces thereof, or may be provided directly on the container 60 by printing or the like. From the viewpoint of accuracy in identifying the opening 63 of the container 60, it is preferable that the markers 81, 82, 83 are provided directly on the container 60. From the viewpoint of utilization of an existing container, it is preferable that the markers 81, 82, 83 are provided as sticker members. In this case, after the processing for identifying the opening 63 of the container 60 is completed, the container 60 can be returned to its original state by removing the markers 81, 82, 83 attached to the container 60. The color and shape of each position marker 81, 82, 83 are determined so that the marker 81, 82, 83 can be easily extracted from the container image by image processing such as pattern matching processing. For example, it is desirable that the color of each marker 81, 82, 83 is determined so as to have a large contrast ratio with respect to the color of the container 60 near the position where the marker 81, 82, 83 is provided and the color of the floor surface on which the container 60 is arranged. Further, it is desirable that the shape of each marker 81, 82, 83 is not similar to shapes that would be included in the container image, such as floor patterns, and shapes of notches or holes of the container 60 provided for weight reduction. Typically, the three markers 81, 82, 83 are all the same, but they may be different from each other or may be of two types.

Figure 3:
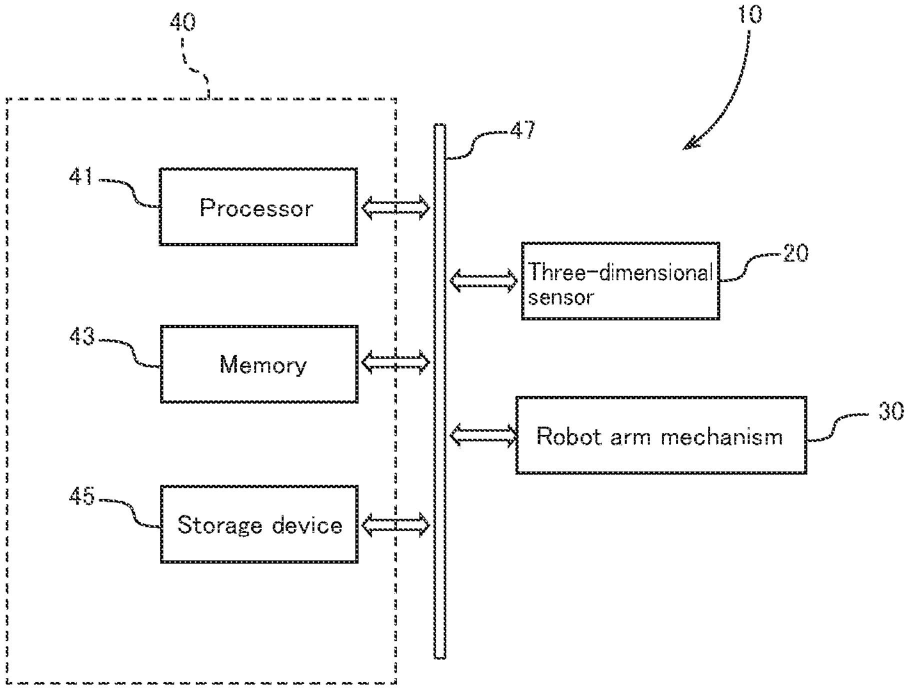
FIG. 3 is a block configuration diagram of the robot system shown in FIG. 1.

As shown in FIG. 3, the control apparatus 40 includes a processor 41. A memory 43, a storage device 45, the three-dimensional sensor 30, and the robot arm mechanism 20 (motor driver) are connected to the processor 41 via a data/control bus 47. The processor 41 performs overall control of the robot system 10. The memory 43 functions as a workspace for the processor 41.

The storage device 45 stores a work program for causing the robot arm mechanism 20 to execute a work for picking workpieces 70 stacked in bulk inside the container 60. The processor 41 functions as a robot control unit for controlling the robot arm mechanism 20 when executing the work program. When the processor 41 executes the work program, the robot arm mechanism 20 can operate in accordance with a sequence defined by the work program, and repeatedly execute an operation of taking out a workpiece 70 from inside the container 60 and transferring it to a designated location such as a conveyor or a workbench. The work program defines the position, orientation, and size of the opening 63 of the container 60 so that the robot arm mechanism 20 does not interfere with the container 60. The position and orientation of the opening 63 of the container 60 in the work program are represented in the robot coordinate system. The position, orientation, and size of the opening 63 of the container 60 are corrected each time the container 60 is replaced.

A program for identifying the opening 63 of the container 60 is associated with the work program as a correction program for correcting the position, orientation, and size of the opening 63 of the container 60. When executing the correction program, the processor 41 functions as a feature point extraction unit for extracting a feature point (marker 81, 82, 83) from the container image, a feature point position identification unit for identifying the three-dimensional position of the feature point (marker 81, 82, 83) from the point cloud data, a center position calculation unit for calculating the three-dimensional position of a center point 65 of the container 60 based on the three-dimensional position of the feature point (marker), a corner position identification unit for scanning the point cloud data from the three-dimensional position of the feature point (marker 81, 82, 83) toward the three-dimensional position of the center point 65 of the container 60 and identifying the three-dimensional position of a corner of the opening 63 of the container 60 (the three-dimensional position of a corner of the inner wall of the container 60), and a container opening identification unit for identifying the position, orientation, and size of the opening 63 of the container 60 based on the three-dimensional position of the corner of the opening 63 of the container 60. When the correction program is executed by the processor 41, the position, orientation, and size of the opening 63 of the container 60 arranged in the container arrangement area are identified, and the position, orientation, and size of the opening 63 of the container 60 in the work program are corrected.

Figure 8:
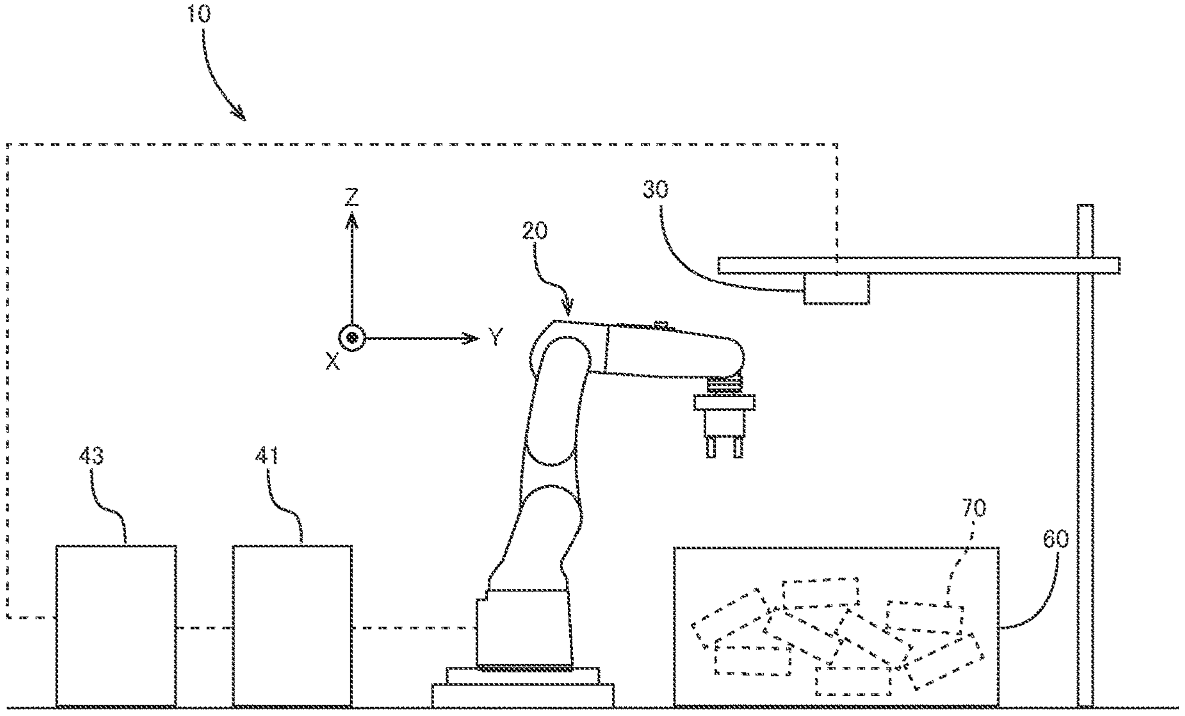
FIG. 8 is an external view showing another example of the robot system according to the present embodiment.

In the present embodiment, the control apparatus 40 has both the function of controlling the robot arm mechanism 20 and the function of identifying the position, orientation, and size of the opening 63 of the container 60, but the robot control apparatus having the function of controlling the robot arm mechanism 20 and the container opening identification apparatus having the function of identifying the position, orientation, and size of the opening 63 of the container 60 may be configured as separate apparatuses. In this case, as shown in FIG. 8, the robot system 10 includes a robot arm mechanism 20, a robot control apparatus 41 for controlling the robot arm mechanism 20, a three-dimensional sensor 30, and a container opening identification apparatus 43 for identifying, based on the output of the three-dimensional sensor 30, the position, orientation, and size of the opening 63 of the container 60 arranged in the container arrangement area 50. The container opening identification apparatus 43 identifies the position, orientation, and size of the opening 63 of the container 60 based on image data and point cloud data relating to the container 60 received from the three-dimensional sensor 30, and transmits information relating to the identified position, orientation, and size of the opening 63 of the container 60 to the robot control apparatus 41. Based on the information relating to the position, orientation, and size of the opening 63 of the container 60 received from the container opening identification apparatus 43, the robot control apparatus 41 corrects these parameters in the work program and controls the robot arm mechanism 20 so as not to interfere with the container 60.

Figure 4:
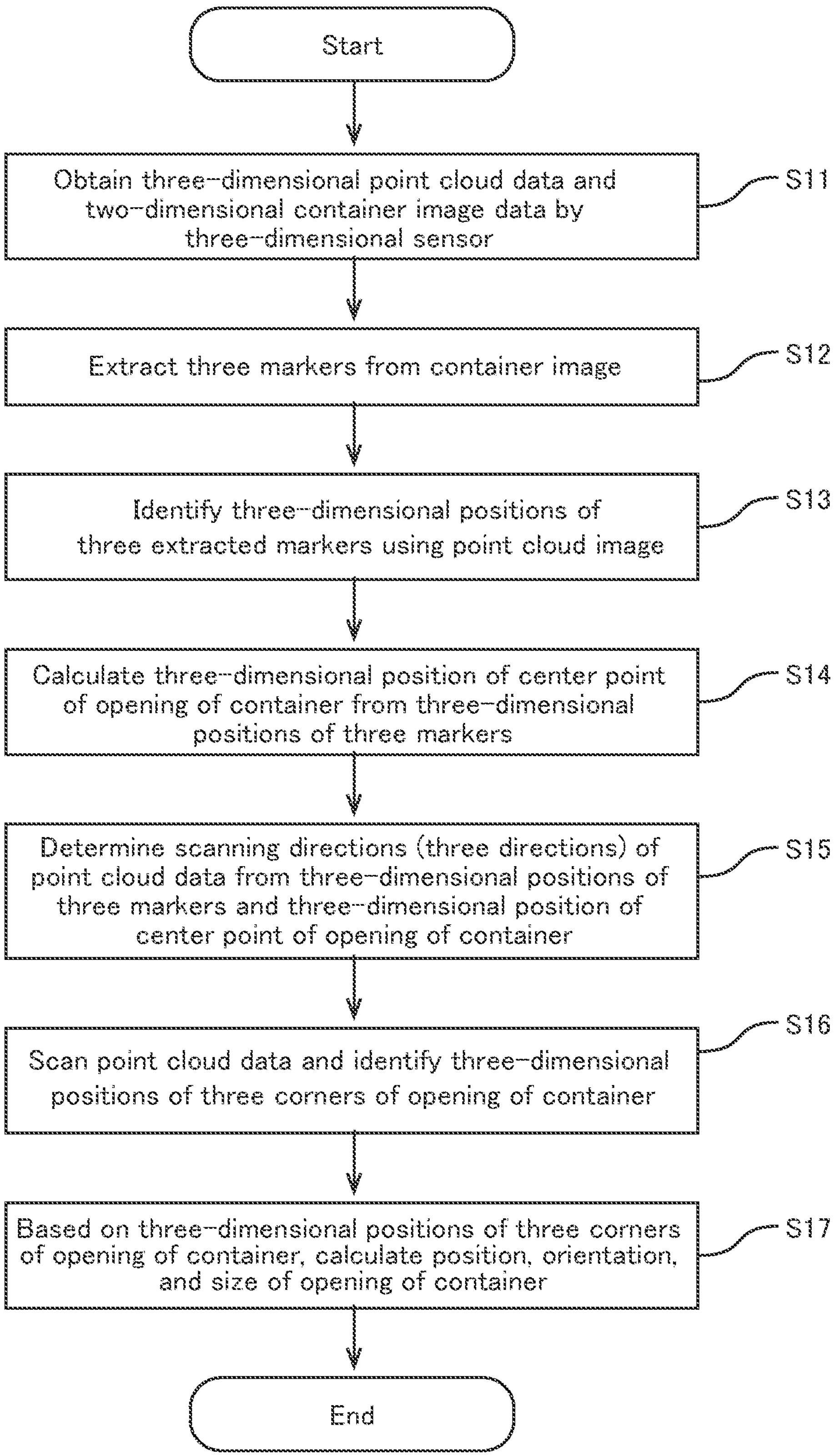
FIG. 4 is a flowchart showing a procedure of container opening identification processing by the robot system shown in FIG. 1.
Figure 5:
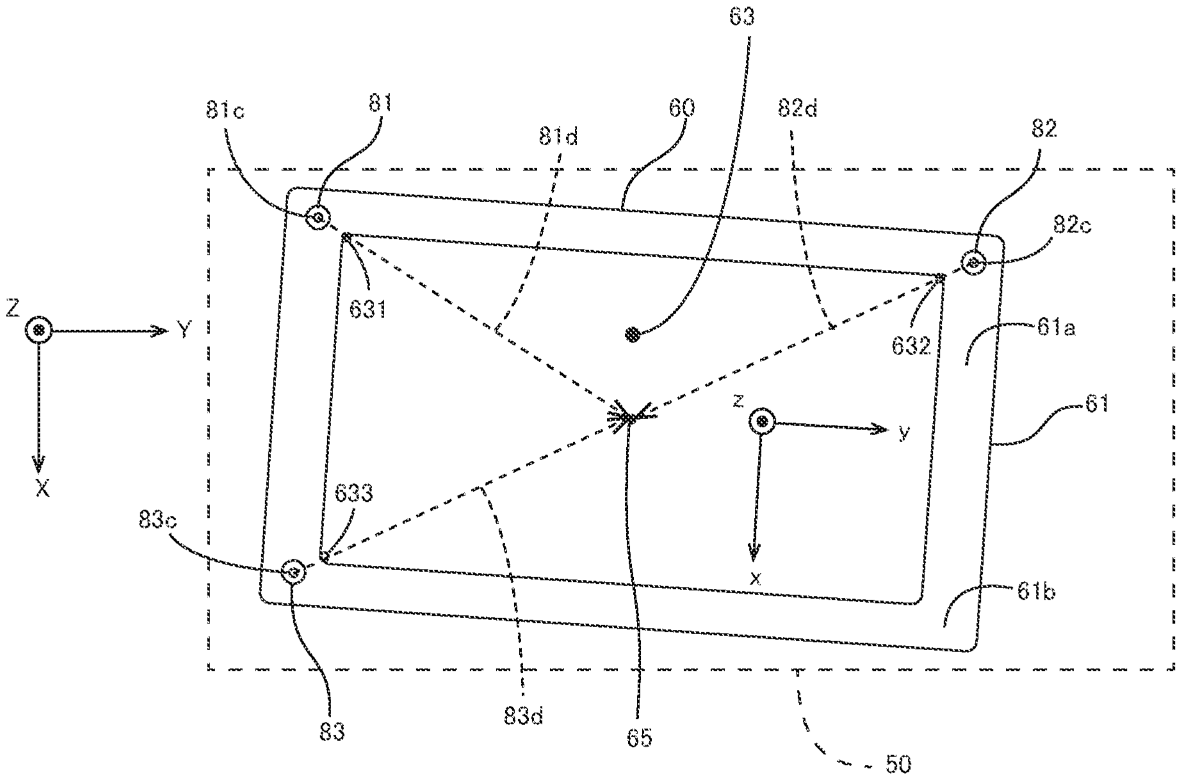
FIG. 5 is a diagram supplementary to the description of the container opening identification processing shown in FIG. 4.

Hereinafter, processing for identifying the position, orientation, and size of the opening 63 of the container 60 (container opening identification processing) by the robot system 10 according to the present embodiment will be described with reference to FIG. 4 and FIG. 5.

When the container 60 is arranged in the container arrangement area, the three-dimensional sensor 30 photographs the container arrangement area and obtains data of a two-dimensional image (container image) including the container 60 and three-dimensional point cloud data including the container 60 (step S11).

Next, predetermined image processing such as pattern matching processing is performed on the container image, three markers 81, 82, 83 are extracted from the container image (step S12), and the two-dimensional coordinates of the center positions 81*c*, 82*c*, 83*c* of the extracted markers 81, 82, 83 are identified.

Using the two-dimensional coordinates of the center positions 81*c*, 82*c*, 83*c* of the markers, the points corresponding to the center positions 81*c*, 82*c*, 83*c* of the markers are identified from the point cloud data, thereby identifying the three-dimensional coordinates of the center positions 81*c*, 82*c*, 83*c* of the markers (step S13). The three-dimensional coordinates of the center position 65 on the opening surface of the container 60 are calculated from the identified three-dimensional coordinates of the center positions 81*c*, 82*c*, 83*c* of the three markers (step S14). The directions 81*d*, 82*d*, 83*d* from the three-dimensional coordinates of the center positions 81*c*, 82*c*, 83*c* of the markers 81, 82, 83 toward the three-dimensional coordinates of the center position 65 of the container 60 are determined as scanning directions of the point cloud data (step S15). It should be noted that the two-dimensional coordinates of the center position 65 on the opening surface of the container 60 may be calculated from the two-dimensional coordinates of the center positions 81*c*, 82*c*, 83*c* of the markers 81, 82, 83 identified in step S12, and the directions 81*d*, 82*d*, 83*d* from the two-dimensional coordinates of the center positions 81*c*, 82*c*, 83*c* of the markers 81, 82, 83 toward the two-dimensional coordinates of the center position 65 of the container 60 may be determined as scanning directions of the point cloud data.

The point cloud data is scanned along the scanning directions 81*d*, 82*d*, 83*d* determined in step S15, and the three-dimensional coordinates of the positions 631, 632, 633 of the corners of the opening 63 of the container 60 (corners of the inner wall of the container 60) are identified (step S16). In step S16, for example, a plurality of points along the scanning direction 81*d* from the point corresponding to the center position 81*c* of the marker 81 in the point cloud data are successively extracted, and height change values (Z coordinate change values) are calculated. When the difference between the height of a particular point and the height of its inner point is less than a threshold value, the two points are determined to be points on the upper end surfaces 61*a* of the container 60. On the other hand, when the difference between the height of a particular point and the height of its inner point is larger than the threshold value, it indicates that there is a boundary between the side walls and opening of the container between the two points, and the inner (container center side) point is identified as a point of a corner of the opening 63 of the container 60.

The position, orientation, and size of the opening 63 of the container 60 are calculated based on the three-dimensional coordinates of the three corner positions 631, 632, 633 of the opening 63 of the container 60 (step S17). In the process of step S17, for example, the position of the opening 63 of the container 60 can be the center position 65 of the container 60. Of course, the position of the opening 63 of the container 60 may be any of the center positions 81*c*, 82*c*, 83*c* of the markers 81, 82, 83. As the orientation of the opening 63 of the container 60, a rotation angle around the X axis, a rotation angle around the Y axis, and a rotation angle around the Z axis can be calculated. For example, the degree of rotation around each axis with respect to the reference state can be calculated using the three-dimensional vector from the corner position 631 to the corner position 632 in the reference state, the three-dimensional vector from the corner position 631 to the corner position 632 identified in step S16, and the rotation coordinate transformation matrix around each axis. As the size of the opening 63 of the container 60, the length (opening length) of the opening 63 of the container 60 in the y-axis direction can be calculated from the three-dimensional coordinates of the corner position 631 and the three-dimensional coordinates of the corner position 632, and the length (opening width) of the opening 63 of the container 60 in the x-axis direction can be calculated from the three-dimensional coordinates of the corner position 631 and the three-dimensional coordinates of the corner position 633.

Note that the orientation of the opening 63 of the container 60 identified in step S17 may be greatly rotated around the X axis or the Y axis, that is, the opening surface of the container 60 may not be horizontal. When the rotation angle around the X axis or the rotation angle around the Y axis is greater than a predetermined value, the reason could be that the foldable container 60 is not properly assembled, the container 60 is damaged, or an object is caught under the container 60. Further, a part of the opening 63 of the container 60 may be outside the operation area of the robot arm mechanism 20, that is, the container 60 may not be properly arranged inside the container arrangement area 50. Therefore, when it is determined that the orientation of the opening 63 of the container 60 is not horizontal with respect to a setting surface of the container arrangement area, or when it is determined that a part of the container 60 protrudes from the container arrangement area 50 based on the position, orientation, and size of the opening 63 of the container 60, the control apparatus 40 may control a notification means (not shown) such as a speaker or a display device to notify the worker before the bulk stacking work by the robot arm mechanism 20 is started.

The position and orientation of the opening 63 of the container 60 identified in the container opening identification processing are typically represented in the coordinate system of the three-dimensional sensor 30. However, since the position and orientation in which the three-dimensional sensor 30 is installed with respect to the robot arm mechanism 20 are known, the position and orientation in the coordinate system of the three-dimensional sensor 30 can be freely converted into the robot coordinate system or the like handled in the work program. Of course, the coordinates in the image data or the point cloud data output from the three-dimensional sensor 30 may be converted into the robot coordinate system in advance.

The robot system 10 according to the present embodiment described above has the following effects.

The container 60 utilized in the robot system 10 and the place where the container 60 is arranged vary. For example, in the pattern matching processing for the container image, the boundary between the side walls 61 and opening 63 of the container 60 may not be able to be identified due to the small contrast ratio. In the processing for scanning the point cloud data and detecting height change values, the position where the height changes may not be the boundary position between the side walls 61 and the opening 63 of the container 60 because the container 60 is provided with a notch, a hole, or the like for weight reduction or the like.

The robot system 10 according to the present embodiment determines the scanning direction of the point cloud data using the image data, and observes the height change values while scanning the point cloud data along the scanning direction determined by the image data, thereby reliably capturing the boundary between the side walls 61 and the opening 63 of the container 60. Thus, the position, orientation, and size of the opening 63 of the container 60 can be detected with high accuracy. As described above, utilizing two types of data, i.e., image data and point cloud data to identify the position, orientation, and size of the opening 63 of the container 60 is one of the features of the robot system 10 according to the present embodiment.

In the present embodiment, it is assumed that the opening 63 of the container 60 has a rectangular shape, but the shape of the opening 63 is not limited to a rectangular shape as long as the position, orientation, and size of the opening 63 can be identified utilizing the image data and the point cloud data. For example, when the opening of the container has a circular shape, markers may be provided at any three locations on the upper end surfaces of the side walls of the container. By identifying three-dimensional positions of the three locations, the three-dimensional coordinates of the center position of the opening of the container can be calculated. When two markers are provided, the first marker may be provided at any location on the upper end surface of a side wall of the container, and the second marker may be provided symmetrically across the center position of the container with respect to the first marker.

In the present embodiment, three markers 81, 82, 83 are provided at three corners 61*b* among the four corners 61*b* of the container 60, but the number of markers may be one. Hereinafter, a modification of the present embodiment will be described with reference to FIG. 6 and FIG. 7.

Figure 6:
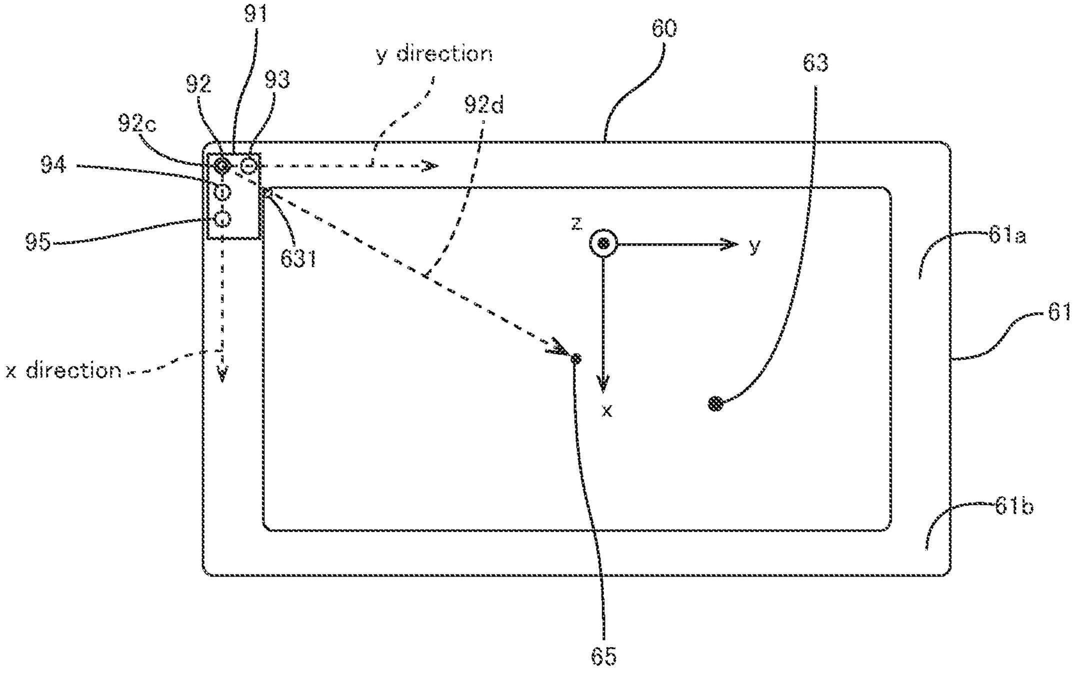
FIG. 6 is a plan view showing an example of a container used in a robot system according to a modification of the present embodiment.

FIG. 6 shows an example of a marker 91 having a pattern which enables identification of the y direction (length direction) and the x direction (width direction) of the container 60. As shown in FIG. 6, the marker 91 has four circular marker portions 92, 93, 94, 95 and, with respect to one reference marker portion 92, one marker portion 93 is arranged along a first direction, and two marker portions 94, 95 are arranged at equal intervals along a second direction orthogonal to the first direction. The marker 91 is provided on the upper end surface 61*a* of the corner 61*b* of the container 60 such that the reference marker portion 92 is arranged at a specific position (origin) of the container 60, the first direction is parallel to the y direction (length direction) of the container 60, and the second direction is parallel to the x direction (width direction) of the container 60.

The processing for identifying the position, orientation, and size of the opening 63 of the container 60 provided with the marker 91 shown in FIG. 6 will be described with reference to FIG. 7. Steps S21 to S27 of the processing for identifying the position, orientation, and size of the opening 63 of the container 60 shown in FIG. 7 correspond to and have much in common with steps S11 to S17 of the processing shown in FIG. 4, respectively. Therefore, detailed descriptions of part of the processing will be omitted.

Figure 7:
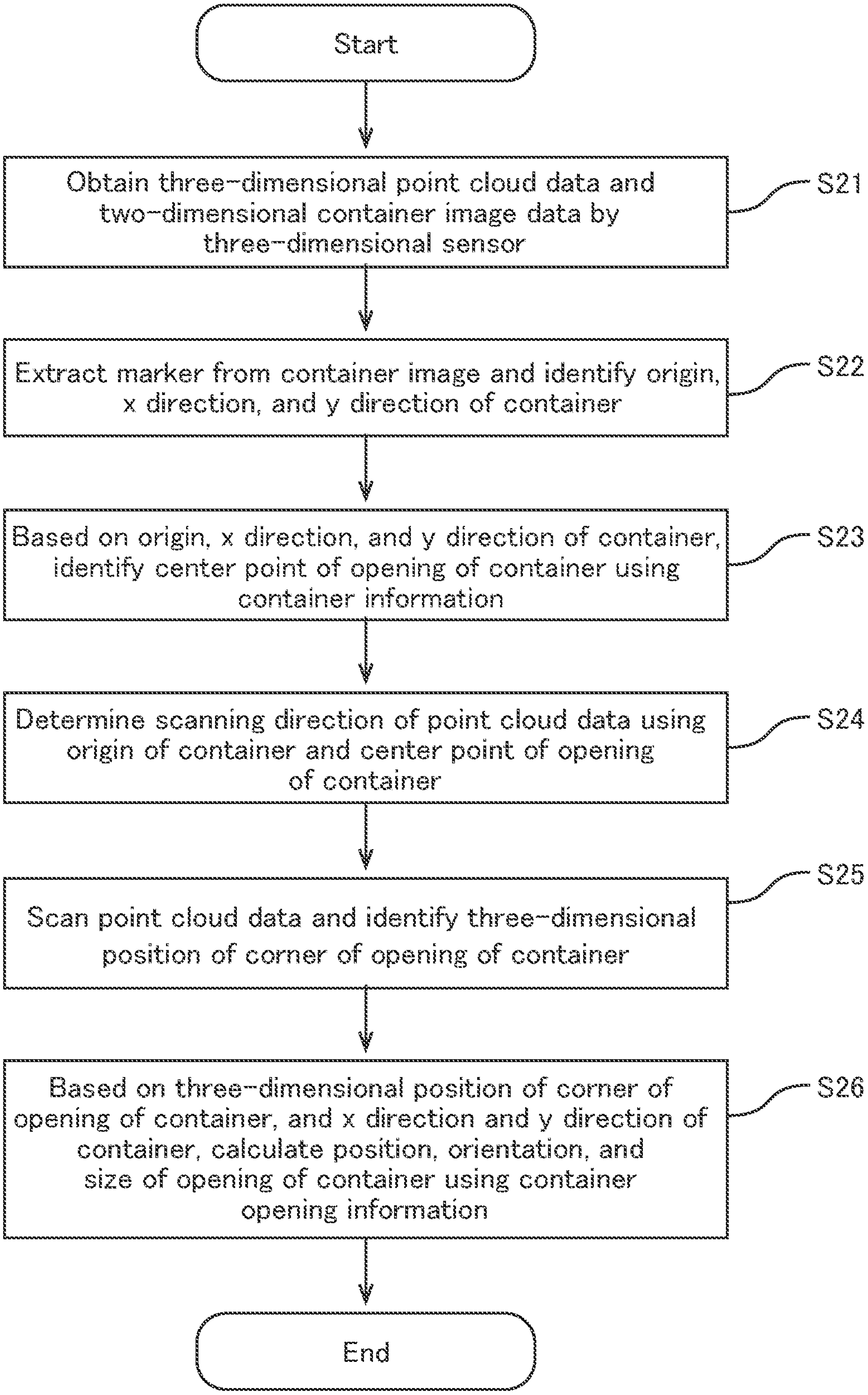
FIG. 7 is a flowchart showing a procedure of container opening identification processing by the robot system according to the modification of the present embodiment.

As shown in FIG. 7, data of the container image and three-dimensional point cloud data including the container 60 are obtained by the three-dimensional sensor 30 (step S21). Next, predetermined image processing such as pattern matching processing is executed on the container image, the marker portions 92, 93, 94, 95 of the marker 91 are extracted from the container image, and the direction in which three marker portions 92, 94, 95 among the extracted four marker portions 92, 93, 94, 95 are arranged is identified as the x direction of the container 60, and the direction in which two marker portions 92, 93 thereamong are arranged is identified as the y direction of the container 60 (step S22). In the process of step S22, the linear direction passing through the center positions of the three marker portions 92, 94, 95 is identified as the x direction of the container 60, and the linear direction passing through the center positions of the two marker portions 92, 93 is identified as the y direction of the container 60. In addition, the center position of the reference marker portion 92 is identified as the specific position (origin) of the container 60.

The storage device 45 of the control apparatus 40 stores container information relating to the length and width of the container 60 with respect to the specific position (origin of the container 60) of the upper end surface 61*a* of the corner 61*b* of the container 60. Since the specific position (origin) of the container 60, the x direction (width direction) of the container 60, and the y direction (length direction) of the container 60 are identified by the process of step S23, the center point 65 on the opening surface of the container 60 can be identified using the container information stored in the storage device 45 (step S23). A direction 92*d* from the center point of the reference marker portion 92 toward the center point 65 of the opening 63 of the container 60 is determined as the scanning direction of the point cloud data (step S24).

The point cloud data is scanned along the scanning direction 92*d* determined in step S25, and the three-dimensional coordinates of the position 631 of the corner of the opening 63 of the container 60 (corner of the inner wall of the container 60) are identified (step S25). The storage device 45 stores container opening information relating to the width and length of the opening 63 of the container 60 with respect to the corner position of the opening 63 of the container 60. Since the three-dimensional coordinates of the corner position 631 of the opening 63 of the container 60 are identified in step S26, and the length direction of the container 60 and the width direction of the container 60 are identified in step S22, the position, orientation, and size of the opening 63 of the container 60 are calculated using the container opening information stored in the storage device 45 (step S26).

The robot system according to the modification described above has the same effects as those of the robot system 10 according to the present embodiment, and can identify the position, orientation, and size of the opening 63 of the container 60 by utilizing two types of data, that is, image data and point cloud data, without causing the robot arm mechanism 20 to perform a touch-up operation on the container 60.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot system for taking out a workpiece stored in a container with an opening at a top of the container, wherein a plurality of markers are disposed at a plurality of locations of the container, the robot system comprising:

- a robot arm mechanism to which a hand for gripping the workpiece is attached;
- a sensor configured to generate image data and point cloud data of the container, wherein
  - the image data contain color information related to the container,
  - the point cloud data include three-dimensional coordinate information related to a surface of the container,
  - the image data are expressed in two-dimensional coordinates (X, Y), and
  - the point cloud data are expressed in three-dimensional coordinates (X, Y, Z),
  - two-dimensional coordinate components (X, Y) of the three-dimensional coordinates (X, Y, Z) in the point cloud data are associated with the two-dimensional coordinates (X, Y) of the image data based on a correspondence relationship between the image data and the point cloud data; and
- a control apparatus configured to:
  - extract the plurality of markers as feature points from the image data by image processing,
  - identify, from the point cloud data, three-dimensional coordinates (X, Y, Z) corresponding to two-dimensional coordinates (X, Y) of the plurality of markers extracted from the image data by referencing the correspondence relationship between the image data and the point cloud data without projecting the point cloud data onto the image data, thereby converting the two-dimensional coordinates (X, Y) of the plurality of markers into three-dimensional coordinates (X, Y, Z) of the plurality of markers,
  - identify a position, orientation, and size of the opening of the container based on the three-dimensional coordinates (X, Y, Z) of the plurality of markers, and
  - control the robot arm mechanism so as not to interfere with the container based on the identified position, orientation, and size of the opening of the container.

2. The robot system according to claim 1, wherein the opening has a rectangular shape, and the control apparatus is configured to:

- extract, as the plurality of markers, three feature points provided on upper end surfaces of three corners of the container from the image data;
- identify, from the point cloud data, three-dimensional coordinates (X, Y, Z) corresponding to two-dimensional coordinates (X, Y) of the extracted three feature points by referencing the correspondence relationship between the image data and the point cloud data without projecting the point cloud data onto the image data; and
- identify the position, orientation, and size of the opening of the container based on the identified three-dimensional coordinates.

3. The robot system according to claim 1, wherein the control apparatus is configured to:

- calculate a three-dimensional position of a center point of the container based on three-dimensional positions of three markers of the plurality of markers,
- scan the point cloud data from the three-dimensional positions of the three markers toward the three-dimensional position of the center point to identify three-dimensional positions of three corners of the opening of the container, and
- identify the position, orientation, and size of the opening of the container based on the three-dimensional positions of the three corners of the opening of the container.

4. A control apparatus for controlling a robot arm mechanism, the control apparatus comprising:

- a reception unit configured to receive image data and point cloud data of a container;
- a feature point extraction unit configured to extract a feature point from the image data;
- a feature point position identification unit configured to identify, from the point cloud data, a three-dimensional position corresponding to a two-dimensional coordinate of the extracted feature point by referencing a correspondence relationship between the image data and the point cloud data without projecting the point cloud data onto the image data;
- a container opening identification unit configured to identify a position, orientation, and size of an opening of the container based on the identified three-dimensional position; and
- a robot control unit configured to control the robot arm mechanism based on the identified position, orientation, and size of the opening of the container.

5. The robot system according to claim 1, wherein the opening has a rectangular shape, and the control apparatus includes a storage unit configured to store container information relating to a width direction and a length direction of the container; and the control apparatus is configured to:

extract, from the image data, a feature point having a pattern enabling identification of the width direction and the length direction of the container;

identify, from the point cloud data, a three-dimensional position of the extracted feature point and directions of the container by referencing the correspondence relationship between the image data and the point cloud data without projecting the point cloud data onto the image data;

calculate a three-dimensional position of a center point of the container based on the identified feature point and the stored container information;

identify a three-dimensional position of a corner of the opening of the container based on the center point; and identify the position, orientation, and size of the opening of the container.

* * * * *